United States Patent [19] [11] 3,852,225
Ishikawa et al. [45] Dec. 3, 1974

[54] POLYMER COMPOSITION HAVING HIGH FLOW PROPERTY

[75] Inventors: Narimasa Ishikawa, Tokyo; Susumu Suzuki; Yasuhiro Ougusa, both of Yokohama; Koozo Arai, Yokkaichi, all of Japan

[73] Assignee: Japan Synthetic Rubber Co., Ltd., Tokyo, Japan

[22] Filed: Dec. 11, 1973

[21] Appl. No.: 423,827

[30] Foreign Application Priority Data
Dec. 14, 1972  Japan.............................. 47-125532

[52] U.S. Cl........... 260/5, 260/33.6 AQ, 260/42.32, 260/42.33, 260/42.39, 260/80.7, 260/83.7, 260/94.2 M, 260/94.3, 260/887, 260/889, 260/894
[51] Int. Cl....... C08c 9/04, C08c 11/22, C08d 9/04
[58] Field of Search........... 260/94.2 M, 94.3, 5, 33, 260/6 AQ, 42.32, 42.33, 42.39, 80.7, 83.7

[56] References Cited
UNITED STATES PATENTS
3,457,250   7/1969   Gaeth .............................. 260/94.3
3,498,963   3/1970   Ichikawa et al.................... 260/93.7
3,535,303   10/1970  Ichikawa et al.................... 260/94.3

Primary Examiner—Allan Lieberman
Assistant Examiner—H. H. Fletcher
Attorney, Agent, or Firm—Ladas, Parry, Von Gehr, Goldsmith & Deschamps

[57] ABSTRACT

A polymer composition having a high flow property is obtained by incorporating 1 to 200 parts by weight of a filler and up to 200 parts by weight of a process oil into 100 parts by weight of a polymer component consisting of at least one polybutadiene having a 1,2-addition unit content of 70 percent or higher, a crystallinity of 5 to 50 percent, and an intrinsic viscosity $[\eta]$ (as measured in toluene at 30°C.) of 0.7 dl/g or higher, or a polymer component consisting of a major amount of at least one said polybutadiene and a minor amount of a rubbery polymer co-vulcanizable therewith.

13 Claims, No Drawings

POLYMER COMPOSITION HAVING HIGH FLOW PROPERTY

DESCRIPTION

This invention relates to a polymer composition having a high flow property comprising a high molecular weight polybutadiene having a high 1,2-addition unit content and a moderate crystallinity.

As for the polybutadiene having a high 1,2-addition unit content (hereinafter referred to as 1,2-polybutadiene), that of a low molecular weight liquid type is currently available on the market and in use for a coating composition, etc., and concerning that of a high molecular weight type, there have only been found a few patents on an amorphous or a highly crystalline species. The amorphous 1,2-polybutadiene is rubbery in nature, and is inferior in processability, and the physical properties of both unvulcanized and vulcanized stocks are also inferior. Therefore, there is a problem in its practical use as a solid rubbery substance. On the other hand, the highly crystalline 1,2-polybutadiene is a powder having a high melting point, and hence, very difficult to process, so that it has been impossible to be put in practical use.

U.S. Pat. Nos. 3,498,963 and 3,522,332 disclose methods for producing high molecular weight 1,2-polybutadienes having moderate crystallinity. The present inventors have done research on physical properties of such 1,2-polybutadienes to find that these 1,2-polybutadienes have properties intermediate between a rubber and a resin, and hence, the physical properties thereof are so characteristic that, for example, (1) the green strength is high, (2) the processability on roll is good, (3) the mill shrinkage is very small, (4) the physical properties of vulcanizate (tensile strength, hardness, etc.) are excellent, and (5) the temperature-dependency of the flow property is high.

The present inventors have found that when such a 1,2-polybutadiene having the aforesaid characteristic properties, alone or in combination with a covulcanizable rubbery polymer, is incorporated with various compounding ingredients, there is obtained a polymer composition having such an excellent flow property that has never been found in conventional rubber compositions or resin compositions, and, in addition, capable of producing a vulcanizate with excellent physical properties. Based on this finding the present invention has been accomplished.

According to this invention, there is provided a polymer composition having a high flow property which comprises 100 parts by weight of a polymer component consisting of at least one polybutadiene having a 1,2-addition unit content of 70 percent or higher, a crystallinity of 5 to 50 percent, and an intrinsic viscosity [$\eta$] (as measured in toluene at 30°C.) of 0.7 dl/g or higher, or a polymer component consisting of a major amount of at least one said polybutadiene and a minor amount of a rubbery polymer co-vulcanizable therewith; 1 to 200 parts by weight of filler; and up to 200 parts by weight of a process oil.

The 1,2-polybutadiene to be used as the essential constituent of the polymer component in this invention is that having a 1,2-addition unit content of 70 percent or higher, preferably 85 percent or higher. If the 1,2-addition unit content is below 70 percent, the aforesaid characteristic properties are lost. On the other hand, the crystallinity should be within the range of 5 to 50 percent, preferably 10 to 30 percent, in view of the ease of mixing. If the crystallinity exceeds 50 percent, the physical properties of the vulcanizate become inferior, while if it is below 5 percent, the flow property or green strength, or the physical properties of vulcanizate are deteriorated. The intrinsic viscosity, [$\eta$]$_{toluene}^{30°C.}$, is 0.7 dl/g or higher, particularly preferably 1.0 dl/g or higher. When the intrinsic viscosity is lower than 0.7 dl/g, the compound tends to stick and there is obtained no composition having excellent green strength and capable of giving a vulcanizate having excellent physical properties. Further, said compound is liquid and hence is difficult to handle. Such 1,2-polybutadienes in this invention can be used alone or in combination of two or more.

The rubbery polymers co-vulcanizable with the aforesaid polybutadiene, which are used in this invention in admixture with the latter, include, for example, styrene-butadiene copolymer rubber, polybutadiene rubber, polyisoprene rubber, ethylene-propylene copolymer rubber, ethylene-propylene-diene terpolymer rubber, and natural rubber. Beside these, it is also possible to use those 1,2-polybutadienes which are amorphous or which have a crystallinity of less than 5 percent. These rubbery polymers may be used alone or in admixture of two or more. The amount of the rubbery polymer is preferably at least 1 percent by weight but less than 50 percent by weight, particularly preferably 5 to 40 percent by weight, based on the weight of the polymer component.

By use of these rubbery polymers in combination with a major amount of the 1,2-polybutadiene, the resulting polymer compositions acquire an excellent flow property and, moreover, produce a vulcanizate excellent in physical characteristics, particularly resilience, compression set, tension set, flex cracking, etc.

The proportion of 1,2-polybutadiene in the aforesaid polymer component in this invention should exceed 50 percent by weight based on the total weight of the polymer components. If the proportion is not more than 50 percent by weight, the resulting composition can no longer be distinguishable with respect to the flow property.

The fillers for use in this invention are those which are generally used as fillers in the rubber technique. Fillers are broadly classified into two groups according to the purpose of their uses. One of the two groups includes those fillers which are used chiefly to improve practically significant physical properties, particularly abrasion resistance and hardness. To this group belong carbon black and finely powdered anhydrous silica, which have various particle diameters and surface structures.

The other group is chiefly used as an extender and a processability-improving agent, and include calcium carbonate, calcium silicate, calcium carbonate surface-coated with a fatty acid or resin acid, magnesium carbonate, magnesium oxide, titanium oxide, zinc oxide, clay, alumina, talc, etc.

The fillers in actual use are properly selected from the two groups by taking into consideration the object of its use and the cost, and may be used alone or in combination.

The amount of the filler to be used is 1 to 200 parts, preferably 10 to 100 parts, by weight per 100 parts by weight of the polymer component. When used in an amount of less than 1 part by weight, the filler has no practical effect, and when the amount exceeds 200 parts by weight, problems arise with respect to physical properties, particularly abrasion and tensile characteristics, of the vulcanizate.

As the process oil for use in this invention, there may be used those which are commonly used as a compounding ingredient for rubber, and the amount to be used is up to 200 parts by weight per 100 parts by weight of the polymer component.

The method of mixing the 1,2-polybutadiene used in this invention with the rubbery polymer covulcanizable therewith has no particular restriction, and for example, solutions of both polymers may be mixed and the solvent may then be removed, or alternatively, both polymers in the form of solid may be mechanically mixed by means of, for example, an open roll, Banbury mixer, internal mixer, kneader-blender, to obtain a similar result.

Also, the method of incorporating the filler and process oil used in this invention into the polymer component has no particular restriction. For example, both ingredients may be mixed together with the polymer component by use of a usual mechanical mixing technique; either of the two ingredients may first be mixed with the polymer component and then with the remaining ingredient; and where the polymer component is a mixture of the 1,2-polybutadiene and the co-vulcanizable rubbery polymer, both the filler and the process oil may be mixed with 1,2-polybutadiene and then blended with the rubbery polymer, or alternatively, both ingredients may first be mixed with the rubbery polymer and then blended with the 1,2-polybutadiene.

The polymer composition of this invention can be cured by conventional press curing, autoclave curing, and other commonly used curing procedures. Moreover, owing to the high flow property, the composition is susceptible to injection molding, which is characteristic of this invention.

In effecting vulcanization, there may be used such vulcanizing agents, vulcanization accelerators, and vulcanization activators as are generally used in rubber processing, and organic peroxides may also be used.

It is, of course, possible to incorporate such commonly used compounding ingredients as antioxidants, ultraviolet absorbers, blowing agents, odoronts, pigments, and softening agents into the polymer composition of this invention.

Owing to a high flow property, the polymer composition obtained according to this invention is very easily processable, and its vulcanizate possesses excellent physical properties, so that the polymer composition can be used in a far broader field than conventional general-purpose rubber compositions or resin compositions, and, furthermore, reduction in manufacturing cost is expectable by use of a large amount of filler and process oil. These advantages are of great industrial value.

The invention is explained below in further detail with reference to Examples. However, the invention is not limited to the Examples unless it departs from the essential feature of the invention.

The micro-structures of the above-noted polybutadienes were measured by the infrared absorption spectrum method of D. Morero et al. [Chimie et Ind., 41, 758 (1959)]. The crystallinity was determined by the density measurement method in which the following equation was used:

$1/d = X/d_{cr} + (1-X)/d_{am}$ wherein $d$: density of the specimen measured at 20°C.,
$d_{cr}$: density of the crystalline region,
$d_{am}$: density of the amorphous region,
$X$: crystallinity in percent.

The value of $d_{cr}$ used was that of the crystalline 1,2-polybutadiene calculated by Natta from X-ray experiments to be 0.963 [G. Natta, J. Polymer Sci., 20, 251 (1956)]. The value of $d_{am}$ used was 0.892 or the density of the 1,2-polybutadiene obtained by the synthesizing process proposed in U.S. Pat. No. 3,498,963 and found to be completely amorphous by X-ray analysis.

In the following Examples, all parts are by weight, unless otherwise indicated.

EXAMPLE 1

By using the three types of 1,2-polybutadienes, the polybutadiene rubber, and the styrene-butadiene copolymer rubber, shown in Table 1, compounds were prepared by means of a Banbury mixer according to the recipes shown in Table 2.

Table 1

| | Microstructural composition (%) | | | Crystallinity (%) | Intrinsic viscosity $[\eta]^{30°}$ c. toluene (dl/g) |
|---|---|---|---|---|---|
| | Cis-1,4 | Trans-1,4 | 1,2 | | |
| 1,2-Polybutadiene (A) | 7.8 | 0 | 92.2 | 25 | 1.43 |
| do. (B) | 10.2 | 0 | 89.8 | 15 | 1.82 |
| do. (X) | 13.3 | 0 | 86.7 | 0 | 2.05 |
| Polybutadiene rubber | 95.4 | 2.6 | 2.0 | 0 | 2.94 |
| Styrene butadiene copolymer rubber | 12.4 | 69.2 | 18.4 | 0 | 2.19 |

Table 2

| Compounding ingredient \ Sample No. | 1 | 2 | 3 | 4 | 5 |
|---|---|---|---|---|---|
| 1,2-Polybutadiene (A) (Part) | 100 | | | | |
| do. (B) (part) | | 100 | | | |
| do. (X) (part) | | | 100 | | |
| Polybutadiene rubber (part) | | | | 100 | |
| Styrene-butadiene copolymer rubber (part) | | | | | 100 |
| Carbon black (HAF) (part) | 40 | | | | |
| Extender oil of aromatic type (part) | 5 | | | | |
| Zinc oxide (part) | 3 | | | | |
| Stearic acid (part) | 2 | | | | |
| Antioxidant (N-isopropyl-N'-phenyl-p-phenylenediamine) (part) | 1 | | | | |
| Sulfur | 1.75 | | | | |
| Vulcanization accelerator MSA (N-oxydiethylene-2-benzothiazole sulfenamide) (part) | 0.8 | 0.8 | 0.8 | — | — |
| Vulcanization accelerator CZ (N-cyclohexyl-2-benzothiazyl sulfenamide) (part) | — | — | — | 0.8 | 0.8 |
| Remarks | Example | | | Comparative Example | |

The compounds thus obtained were subjected to measurement of flow property and green strength, and the vulcanizates obtained by vulcanizing the compounds at 145°C. for 40 minutes were subjected to measurement of physical properties. The results obtained are shown in Table 3.

By using the three types of 1,2-polybutadienes shown in Table 4 and an ethylene-propylene copolymer rubber having a propylene content of 52 percent by weight, compounds were prepared by means of an open roll according to the recipes shown in Table 5, and subjected to measurement of flow property. The results obtained are shown in Table 6.

Table 3

| Item of test \ Sample No. | 1 | 2 | 3 | 4 | 5 |
|---|---|---|---|---|---|
| Flow property (1) (Kōka type flow tester) | | | | | |
| Ejected volume, Q × $10^3$ (cm³/sec.) 100°C. | 0.5 | 2.0 | 2.7 | 3.3 | 1.5 |
| 120°C. | 2.7 | 4.8 | 2.2 | 4.0 | 3.1 |
| 140°C. | 16.0 | 1.0 | 2.2 | 4.8 | 4.5 |
| Green strength | | | | | |
| At room temperature | | | | | |
| Tensile strength (kg/cm²) | 97.0 | 80.8 | 4.6 | 1.4 | 3.8 |
| Elongation (%) | 550 | 640 | 310 | 2000 | 420 |
| At 40°C. | | | | | |
| Tensile strength (kg/cm²) | 78.7 | 59.4 | 2.7 | 1.2 | 2.4 |
| Elongation (%) | 540 | 630 | 260 | 340 | 290 |
| At 80°C. | | | | | |
| Tensile strength (kg/cm²) | 11.9 | 3.4 | 1.3 | 0.9 | 0.9 |
| Elongation (%) | 440 | 220 | 270 | 320 | 310 |
| Physical properties of vulcanizate | | | | | |
| 300% Modulus (kg/cm²) | 121 | 99 | 86 | 73 | 91 |
| Tensile strength (kg/cm²) | 162 | 182 | 151 | 179 | 268 |
| Elongation (%) | 670 | 750 | 480 | 530 | 590 |
| Hardness (JIS Hs) | 91 | 86 | 63 | 58 | 62 |
| Remarks | Example | | | Comparative Example | |

Note: (1) Measured under a load of 50 kg
Nozzle: 1 mm φ × 2 mm

EXAMPLE 2

Table 4

| | 1,2-addition unit content (%) | Crystallinity (%) | $[\eta]^{30°}$ toluene (dl/g) |
|---|---|---|---|
| 1,2-Polybutadiene (C) | 92.3 | 24 | 1.39 |
| do. (D) | 90.0 | 17 | 1.58 |
| do. (Y) | 85.0 | 0 | 2.20 |

Table 5

| Sample No. Compounding ingredient | 6 | 7 | 8 | 9 |
|---|---|---|---|---|
| 1,2-Polybutadiene Ⓒ (part) | | | 100 | 60 |
| do. Ⓓ (part) | | 40 | | |
| do. Ⓨ (part) | 100 | 60 | | |
| Ethylene-propylene copolymer rubber (part) | | | | 40 |
| Zinc carbonate (part) | | | 2 | |
| Stearic acid (part) | | | 1 | |
| White carbon (hydrated silica) (part) | | | 20 | |
| Remarks | Comparative Example | | Example | |

Table 6

| Sample No. Item of test | 6 | 7 | 8 | 9 |
|---|---|---|---|---|
| Flow property (1) (Kōka type flow tester) Ejected volume, Q × 10³ (cm³/sec.) 120°C. | 0.8 | 1.3 | 8.5 | 5.0 |
| 150°C. | 2.2 | 5.7 | 44.0 | 17.6 |
| Remarks | Comparative Example | | Example | |

Note: (1) Measured under a load of 30 kg.
Nozzle: 1 mm φ × 1 mm

The compounds of Sample Nos. 6, 7 and 8 were further mixed with the vulcanizing ingredients, shown in Table 7, by means of a roll mill, then press-cured at 160°C. for 15 minutes, and the resulting vulcanizates were subjected to mesurement of physical properties. The results obtained are shown in Table 7.

Table 7

| Sample No. Compounding ingredient and item of test | | 10(6) | 11(7) | 12(8) |
|---|---|---|---|---|
| Vulcanizing ingredients (part) | | | | |
| Diethylene glycol | | | 2 | |
| Vulcanization accelerator TS (tetramethylthiuram monosulfide) | | | 0.5 | |
| Mixed vulcanization accelerator DM + H (dibenzothiazyl disulfide + hexamethylene tetramine) | | | 2 | |
| Sulfur | | | 1.5 | |
| Physical properties of vulcanizate | | | | |
| 100% modulus | (kg/cm²) | 10 | 16 | 56 |
| 300% modulus | (kg/cm²) | — | 42 | 88 |
| Tensile strength | (kg/cm²) | 28 | 61 | 180 |
| Elongation | (%) | 260 | 380 | 520 |
| Hardness | (JIS Hs) | 51 | 60 | 90 |
| Tear strength | (kg/cm) | 17 | 21 | 70 |
| Resilience | (%) | 60 | 56 | 36 |
| Remarks | | Comparative Example | | Example |

The compounds of Sample Nos. 8 and 9 were each mixed with 3 parts of di-tert-butylperoxy-3,3,6-trimethylcyclohexane, and the resulting mixtures were press-cured at 160°C. for 15 minutes, and the vulcanizates thus obtained were subjected to measurement of physical properties. The results obtained are shown in Table 8.

Table 8

| Sample No. Item of test | | 13(8) | 14(9) |
|---|---|---|---|
| Physical properties | | | |
| 100% modulus | (kg/cm²) | 95 | 55 |
| 300% modulus | (kg/cm²) | — | — |
| Tensile strength | (kg/cm²) | 133 | 60 |
| Elongation | (%) | 180 | 140 |
| Hardness | (JIS) Hs | 92 | 85 |
| Tear strength | (kg/cm) | 52 | 30 |
| Resilience | (%) | 33 | 36 |
| Tension set | (%) | 23 | 15 |
| Remarks | | Examples | |

EXAMPLE 3

By using 1,2-polybutadiene Ⓔ having a 1,2-addition unit content of 91.5 percent, a crystallinity of 25 percent, and an intrinsic viscosity, $[\eta]_{toluene}^{30°C}$, of 1.39 dl/g and the styrene-butadiene copolymer rubber used in Example 1, compounds were prepared by means of an open roll according to the compounding recipes shown in Table 9, and the vulcanizates obtained by vuncanizing the compounds at 160°C. for 15 minutes were subjected to measurement of various physical properties. The results obtained are shown in Table 9.

Table 9

| Sample No. Compounding ingredient and item of test | | 15 | 16 | 17 | 18 |
|---|---|---|---|---|---|
| 1,2-Polybutadiene Ⓔ (part) | | 100 | 80 | 70 | 60 |
| Styrene-butadiene copolymer rubber (part) | | 0 | 20 | 30 | 40 |
| Compounding ingredient (part) | | | | | |
| Zinc carbonate | | | | 2 | |
| Stearic acid | | | | 1 | |
| White carbon (hydrated silica) | | | | 20 | |
| Diethylene glycol | | | | 2 | |
| Vulcanization accelerator TS (tetramethylthiuram monosulfide) | | | | 0.5 | |
| Mixed vulcanization accelerator DM + H (dibenzothiazyl disulfide + hexamethylene tetramine) | | | | 2 | |
| Sulfur | | | | 1.5 | |
| Physical property vulcanizate | | | | | |
| 100% modulus | (kg/cm²) | 56 | 48 | 41 | 35 |
| 300% modulus | (kg/cm²) | 88 | 79 | 73 | 62 |
| Tensile strength | (kg/cm²) | 180 | 161 | 148 | 138 |
| Elongation | (%) | 520 | 530 | 510 | 510 |
| Hardness | (JIS Hs) | 90 | 89 | 87 | 84 |
| Tear strength | (kg/cm) | 70 | 65 | 54 | 59 |
| Resilience | (%) | 36 | 40 | 40 | 42 |
| Compression set | (%) | 196 | 173 | 156 | 147 |
| Ross type flexing test (1) (mm) | | | | | |
| 50,000 times | | 8.1 | 3.4 | 3.6 | 3.5 |
| 100,000 times | | 17.7 | 3.5 | 4.2 | 3.9 |
| Remarks | | Example | | | |

(1) Cut growth 2 mm

What is claimed is:

1. A polymer composition having a high flow property, which comprises 100 parts by weight of a polymer component consisting of at least one polybutadiene having a 1,2-addition unit content of 70 percent or higher, a crystallinity of 5 to 50 percent, and an intrinsic viscosity of 0.7 dl/g or higher as measured in toluene at 30°C., or a polymer component consisting of a major amount of at least one said polybutadiene and a minor amount of a rubbery polymer co-vulcanizable therewith; 1 to 200 parts by weight of a filler; and up to 200 parts by weight of a process oil.

2. A polymer composition according to claim 1, wherein the polybutadiene has a 1,2-addition unit content of 85 percent or higher.

3. A polymer composition according to claim 1, wherein the polybutadiene has a crystallinity of 10 to 30 percent.

4. A polymer composition according to claim 1, wherein the polybutadiene has an intrinsic viscosity of 1.0 dl/g or higher as measured in toluene at 30°C.

5. A polymer composition according to claim 1, wherein the polybutadiene has a 1,2-addition unit content of 85 percent or higher, a crystallinity of 10 to 30 percent and an intrinsic viscosity of 1.0 dl/g or higher as measured in toluene at 30°C.

6. A polymer composition according to claim 1, wherein the polymer component consists of at least one polybutadiene having a 1,2-addition unit content of 70 percent or higher, a crystallinity of 5 to 50 percent and an intrinsic viscosity of 0.7 dl/g or higher as measured in toluene at 30°C.

7. A polymer composition according to claim 1, wherein the rubbery polymer is selected from the group consisting of styrene-butadiene copolymer rubbers, polybutadiene rubbers, polyisoprene rubbers, ethylene-propylene copolymer rubbers, ethylene-propylene-diene terpolymer rubbers, amorphous 1,2-polybutadiene or 1,2-polybutadiene having a crystallinity of less than 5 percent, and natural rubber.

8. A polymer composition according to claim 1, wherein the polymer component contains at least 1 percent by weight but less than 50 percent by weight of the rubbery polymer.

9. A polymer composition according to claim 8, wherein the amount of the rubbery polymer is 5 to 40 percent by weight based on the weight of the polymer component.

10. A polymer composition according to claim 1, wherein the filler is carbon black or finely powdered anhydrous silica.

11. A polymer composition according to claim 1, wherein the filler is selected from the group consisting of calcium carbonate, calcium silicate, magnesium carbonate, magnesium oxide, titanium oxide, zinc oxide, clay, alumina, talc, and calcium carbonate surface-cated with a fatty acid or resin acid.

12. A polymer composition according to claim 1, wherein the amount of the filler is 10 to 100 parts by weight.

13. A vulcanized product of the composition according to claim 1.

* * * * *